United States Patent Office 3,553,325
Patented Jan. 5, 1971

---

3,553,325
METHOD FOR TREATING BURNS WITH METHENAMINE MANDELATE
Philip H. Taylor, 220 Cheltenham Road, Columbus, Ohio 43220
No Drawing. Filed Mar. 18, 1968, Ser. No. 714,053
Int. Cl. A61k 27/00
U.S. Cl. 424—249        2 Claims

ABSTRACT OF THE DISCLOSURE

The present invention relates to a novel method for treating a mammalian body afflicted with burns. This method is effected by applying topically to the affected site menthenamine mandelate.

---

The present invention relates to a novel method and, more particularly, this invention relates to a novel method for treating mammalian bodies afflicted with burns. This method is effected by applying topically to affected sites menthenamine mandelate.

Currently, many methods are available for treating burns. Most of the problems associated with burns is the resulting bacterial infection. These bacterial infections may be caused by both gram positive as well as gram negative bacteria. In order to combat these bacterial infections, the affected area is often treated with a cream optionally containing a local anaesthetic to alleviate the pain and an antimicrobial agent to halt infection. While some of these methods are quite effective in treating infections caused by certain susceptible bacteria, they are not entirely satisfactory in treating infections caused by the gram negative bacteria *Pseudomonas aeruginosa*. This bacteria is usually quite resistant to currently available systemic therapy.

Accordingly, a primary object of this invention is to provide a novel method for the treatment of burns which is particularly effective in preventing ensuing Pseudomonas infection.

Another object of this invention is to provide a topical composition containing menthenamine mandelate which is useful in treating thermal burns.

Other objects and advantages of this invention will become more apparent from the following detailed description.

Menthenamine mandelate is a known systemic antibacterial compound which is marketed under the trade name "Mandelamine" by Warner-Chilcott Laboratories, Morris Plains, New Jersey. For example, Physician's Desk Reference, 1965 edition, page 1012, describes Mandelamine as ". . . a highly effective antibacterial, active only in the urinary tract, is a soluble chemical combination of mandelic acid and menthenamine."

It has now been found that menthenamine mandelate, when applied topically to mammalian bodies afflicted with burns, has a totally unexpected therapeutic effect in preventing infection.

Thus, for example, rats which are artificially burned by scalding with boiling water on the dorsum are treated with a composition containing various concentrations of menthenamine mandelate varying from 3, 5, 10, 20 and 30 percent by weight in an inert vehicle survive without any serious infections throughout the experiment. In contrast, rats with burns which were treated without menthenamine mandelate had a 95 to 100 percent mortality within two weeks.

Broadly speaking, the practice of this invention is effected by suspending or mixing about 3–30 percent menthenamine mandelate in a base suitable for topical application. For example, it may be suspended in an inert oil such as liquid petroleum or it may be mixed with a vanishing cream base, preferably it is incorporated in a hydrophilic ointment such as the one used in this experiment. In use, the composition containing the active ingredient is applied liberally to the affected site. Generally speaking, such a composition may be applied two or three times daily.

In order to broaden and enhance the therapeutic spectrum of this invention, the above described compositions may optionally contain other therapeutic agents, for example, local anaesthetics such as novacaine, xylocaine and the like.

In order to further illustrate the practice of this invention, the following example is given.

EXAMPLE 1

Forty rats were used in a pilot study. Their backs were shaved over an area of approximately 30 percent of the body surface. Each rat was then burned in a special device using boiling water for approximately 10 seconds. Intraperitoneal Nembutal was used as an anaesthetizing agent. Five minutes after burning the rats were seeded with 1 cc. of a strong broth culture of pure *Pseudomonas aeruginosa*. The rats were then placed aside for ½ hour and treated by spreading the vehicle with Mandelamine over the entire area of the burn. Sixteen control animals received no treatment; 10 received 30 percent Mandelamine in Velvachol®; and 10 received 50 percent Mandelamine in Velvachol.

Velvachol, a product of Texas Pharmacal Company is a hydrophilic type base containing cholesterin, sodium lauryl sulfate, cetyl alcohol, stearyl alcohol, petrolatum, mineral oil and purified water.

Each rat was then placed in its own cage, and labeled according to animal number, experiment, and medication. Each rat in the treatment group was treated with the appropriate cream daily and a running log maintained. The experiment extended for 3 weeks. When a rat died, an autopsy was performed.

Result.—In an experiment comprising 40 rats in a pilot study and 250 rats in an expanded study (with 16 controls and 50 controls respectively), Mandelamine cream applied to artificially induced burns in various concentrations increased the survival rate of treated rats over the survival rate of rats treated with cream alone.

It is understood that the foregoing detailed description is given merely by way of illustration and that many variations may be made therein without departing from the spirit of my invention.

Having described my invention, what I desire to secure by Letters Patent is:

1. A method for treating mammalian bodies afflicted with burns which comprises applying topically to the affected sites a composition containing from about 3 to about 30% by weight menthenamine mandelate in an inert vehicle.

2. A method according to claim 1 wherein said composition containing menthenamine mandelate is applied topically to the affected site two or three times daily.

References Cited

UNITED STATES PATENTS 3,154,546    10/1964    Chessin, Max _____ X424—249

OTHER REFERENCES

Physician's Desk Reference, 21st edition, 1967, pp. 1170, 1171.
Science News Letter, Oct. 1, 1960, p. 211.

ALBERT T. MEYERS, Primary Examiner
N. H. DREZIN, Assistant Examiner